United States Patent
Ramirez et al.

(10) Patent No.: US 7,258,801 B2
(45) Date of Patent: Aug. 21, 2007

(54) SYSTEM AND METHOD FOR REDUCING DEIONIZED WATER CONSUMPTION

(75) Inventors: Jorge Ramirez, Glendale, CA (US); Hector Joel Castaneda, Lynwood, CA (US); Jose Luis Tlaxca, Gardena, CA (US)

(73) Assignee: Heatflex Corporation, Arcadia, CA (US)

( * ) Notice: Subject to any disclaimer, the term of this patent is extended or adjusted under 35 U.S.C. 154(b) by 344 days.

(21) Appl. No.: 10/940,249

(22) Filed: Sep. 13, 2004

(65) Prior Publication Data

US 2006/0054566 A1    Mar. 16, 2006

(51) Int. Cl.
*C02F 1/02* (2006.01)
*C02F 1/72* (2006.01)

(52) U.S. Cl. ............ 210/746; 210/764; 210/765; 210/766; 210/652; 210/681; 210/900; 392/466

(58) Field of Classification Search ............ 210/652, 210/746, 765, 766, 900, 177, 181, 194, 764, 210/681; 392/466
See application file for complete search history.

(56) References Cited

U.S. PATENT DOCUMENTS 3,870,033 A * 3/1975 Faylor et al. ............ 392/470
4,835,365 A    5/1989 Ethridge
5,784,531 A * 7/1998 Mann et al. ............ 392/494
5,930,458 A    7/1999 Yane et al.

FOREIGN PATENT DOCUMENTS

FR    2398976 A *    3/1979

* cited by examiner

*Primary Examiner*—Matthew O. Savage
(74) *Attorney, Agent, or Firm*—Kelly Lowry & Kelley, LLP

(57) ABSTRACT

A system and method are provided for reducing DI water consumption by delivering the DI water at an elevated processing temperature when demanded. The DI water is passed through a heater for heating the DI water to a processing temperature in a single pass. The DI water is circulated through a recirculation loop, including the heater, until demanded. The DI water is monitored for contaminants and bubbles or voids. Detected contaminants or voids are discharged through vents of the system. Turbulence or biocides can be introduced into the recirculated DI water for inhibiting biological contamination.

22 Claims, 3 Drawing Sheets

SYSTEM AND METHOD FOR REDUCING DEIONIZED WATER CONSUMPTION

BACKGROUND OF THE INVENTION

The present invention generally relates to heating systems. More particularly, the present invention relates to a system and method for elevating the deionized water temperature for on-demand use while maintaining water purity and reducing consumption due to trickle flow.

In the biomedical, medical, pharmaceutical, and microchip process sensitive industries, there is a present need to heat ultra pure fluids, such as deionized water. For example, during the manufacture of computer microchips, acids may be used for etching the microchips, and water may be used for rinsing. Because of the small scale of today's microcircuits and the high manufacturing tolerances required, virtually any impurity in the etching or rinsing fluid can result in defective parts and wasted resources.

It is well-known that the semi-conductor industry uses large amounts of water. A large portion of that water is used to produce deionized (DI) or ultra pure water. In the manufacturing process, DI water is used to rinse and clean semi-conductor wafers. Approximately 1,500 gallons of city water are required to produce 1,000 gallons of DI water. It is estimated that over 2,000 gallons of DI water is required in the production of one 200-mm wafer. Large manufacturing facilities can use approximately three million gallons of DI water per day.

Aside from the cost of the city water itself, producing DI water involves ultraviolet lamps, filters, pumps and recirculating systems which require energy to operate. It is also costly to remove effluents via a water-treatment plant. It is estimated to cost approximately US$12.00 to generate 1,000 gallons of DI water. Reducing DI water consumption by only 1,000 gallons lowers power use by 46 kWh. By reducing DI water use by 10%, a facility using three million gallons of DI water daily can save 5 million kWh annually, or about US$225,000, at an energy price of US4.5¢ per kWh, as well as the savings costs which would otherwise be required for disposal of the wastewater.

After the DI water is produced, it is distributed to the pertinent equipment requiring it by distribution piping that travels throughout the manufacturing facility. Standard equipment requiring DI water include wet benches and process tools. It is often the case that the DI water used in process tools and wet benches is heated for better cleaning results. This is especially the case in rinsing steps that occur after a process involving heated chemistries such as SC1 (typically between 75°-80° C.) or Nitride Etch (typically between 150°-180° C.). Industry has found that the benefits of using heated DI water can include better cleaning results, less water consumption, and reduced potential of stresses to the wafer caused by thermal shock. Therefore, when heated water is used, the DI water travels through a DI water heater prior to reaching the wet bench or process tool.

A common plumbing practice is to configure the wet bench and process tool to allow a continuous or idle flow of the DI water. This is sometimes referred to as a "trickle" flow. The trickle flow is a small continuous DI water flow allowed through the heater and tool and into the drain. Dump rinsers, which are used to rinse the product after an etch operation, are configured to perform "idle" flow, a continuous DI water overflow of the dump rinser. The "trickle" flow and "idle" flow are used to prevent particle and bacteria growth in the heater, tool and/or distribution line. The idle or trickle flow prevents stagnant water or dead legs. Since the trickle flow is continuously flowing into the drain, a large amount of the DI water consumption in a fabrication facility can be attributed to this practice.

Another practice that results in DI water waste is the wait time for equipment to reach the correct temperature as production yields and results have been found to vary with temperature variations. Since temperature is a critical factor in semi-conductor manufacturing, the user must insure that correct temperatures are obtained prior to using the DI water. Therefore, when the DI water is first demanded from a heater, the heater will need to warm up and get to temperature. The DI water is directed into a drain until the proper temperature is reached.

There do exist water heaters which are capable of heating the DI water to the processing temperature in a single pass. For example, Ethridge (U.S. Pat. No. 4,835,365) describes a typical DI water heater that uses PFA (Perflouroalkoxy) Teflon jacketed resistant heaters. By maintaining all wetted parts to be non-contaminating PFA or PVDF (Polyvinydene Fluoride) and designing the system to operate as a single pass system, it is able to provide high purity water at elevated temperatures.

Yane et al., (U.S. Pat. No. 5,930,458) describes another prior art ultra-pure fluid heater that can be used to heat DI water. The heater system offers the same benefits as Etheridge, except Yane utilizes quartz instead of Teflon to isolate the resistance heater from the DI water.

However, these heaters also require trickle flow for the systems at periods when the user does not require DI water. If a trickle is not present, then the DI water in the heater becomes stagnant and the system becomes a dead leg with potential for bacteria and particle build-up. Accordingly, both systems require wait time for the DI water output to reach the desired temperature.

Accordingly, there is a continuing need for a system that heats DI water to an elevated temperature for processing needs in a single pass. What is further needed is a system that reduces or even completely eliminates trickle flow and the costs associated therewith. The present invention fulfills these needs and provides other related advantages.

SUMMARY OF THE INVENTION

The present invention resides in a method for reducing DI water consumption by utilizing a system designed for delivering the DI water at an elevated processing temperature without the need for a trickle or idle flow. The system of the present invention has the added benefit of maintaining DI water purity while supplying water essentially on-demand.

The system of the present invention generally comprises a heater in fluid communication with a system DI water inlet. The heater is adapted to heat the DI water to its predetermined processing temperature in a single pass. The heater may comprise one or more heaters. A valve selectively directs the heated DI water to an end user for the process manufacturing or the like, or to a recirculation loop which includes the heater if water is not demanded at that time.

The recirculation loop may include a valve and at least one alternate loop plumbing for altering the flow direction of the recirculated DI water.

In a particularly preferred embodiment, a sensor, such as a resistivity sensor is used to detect contaminants in the DI water. A valve in the system can be selectively opened for discharging the contaminated DI from the system.

A sensor is also preferably utilized for detecting bubbles or voids in the recirculated DI water. A valve or vent is selectively opened for discharging the bubbles and voids from the recirculated DI water. In such case, additional DI water is introduced through the inlet to the heater to replace the vented bubbles and voids.

In another embodiment, a source of gas having a gas inlet into the recirculated DI water is provided. The source of gas may be pressurized and configured to create turbulence in the recirculated DI water for inhibiting biological contamination. Alternatively, and/or additionally, the gas may comprise a biocidal gas, such as ozone, for killing any biological contaminants.

Thus, the heated DI water is passed through a recirculation loop until demanded by the end user, where it is directed to the end user processing at the elevated temperature without the need for a trickle flow or additional time for heating.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a system and method for reducing deionized water consumption by delivering the deionized (DI) water at an elevated processing temperature on demand. The present invention is designed to do so while taking into account potential contamination, thus maintaining DI water purity. In particular, the present invention resolves the problems in the prior art of an effective system for eliminating the requirement for trickle or idle flow in a DI water heating system, and also eliminates the need to heat up or wait time required for at-temperature DI water.

Figure 1:
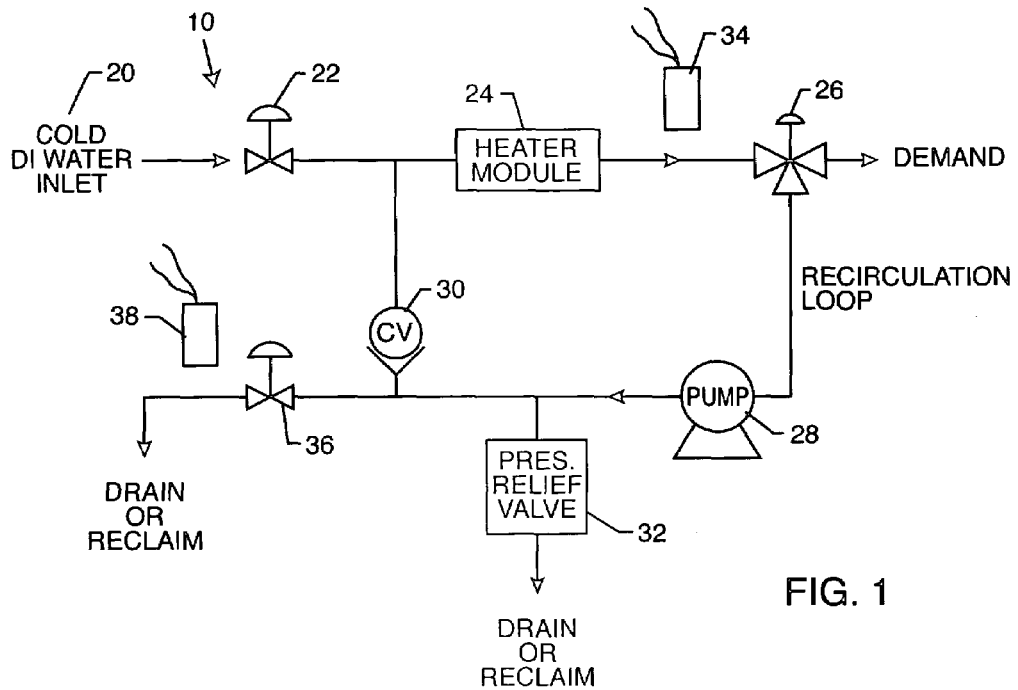
FIG. 1 is a schematic diagram representing an embodiment of the system of the present invention for continually recirculating deionized water at a processing temperature until demanded by an end user.

With reference now to FIG. 1, in one embodiment of the system 10, "cold" DI water is introduced through an inlet valve and into the heater module 24. When referring to "cold" DI water 20, this refers to the source of DI water which is supplied to the system 10. As this source of DI water is typically at a temperature less than that desired at the processing by the end user, it is referred to as "cold", although it may be at varying temperature levels.

The heater module 24 is selected and adapted such that as the "cold" DI water 20 travels through the heater module 24, it is heated to the necessary processing temperature in a single pass. The heater power required for this to occur is determined by multiplying the flow rate with the desired change in temperature, then dividing by a constant. If the flow rate is in gallons per minute, and change in temperature is T (desired) subtracted by T (at inlet) in Celsius, then the constant is 3.79. Thus, the heater power for one-pass heat-up is calculated as follows:

$$\text{Heater Power (kW)} = \frac{(\text{Max. Flow rate [Gallons/Min]} * \text{desired change in temperature [Delta T } ^\circ \text{ C.]})}{3.79}$$

With the calculated kilowatt (kW) requirement, the system 10 is able to provide the desired water temperature at the given flow, continuously. During demand periods, valve 22 is open such that the incoming source of DI water 20 goes through the inlet valve 22, through the heater 24, then through another valve 26 serving as an outlet to the end user's process. As mentioned above, the heater is sized and adapted to heat the source of cold DI water 20 to the desired temperature with a single pass. As such, the heater module 24 can comprise a single heating unit, or a plurality of heating units as is necessary. One such heater that is capable of heating to the desired processing temperature is the Juno® provided by the ICD/Heateflex Company of Arcadia, Calif.

As the system 10 of the present invention is designed for high purity applications, the valves 22 and 26 are comprised of PFA (Perflouroalkoxy) Teflon or PTFE (Polytetrafluorethylene) Teflon material. Typically, these valves 22 and 26 are of the air-operated type and thus connected to a source of pressurized or compressed air. In the demand mode, when hot DI water is desired, the inlet 22 is open and the outlet valve 26 is open to the demand. The DI water travels through the inlet valve 22 through the heater module 24 and provides DI water at the desired temperature to the end user for processing, such as microchip and microelectronic manufacturing processes.

When the end user does not require heated DI water, the system 10 will go into a recirculation mode. Valve 26 is preferably a three-way valve. Thus, in the recirculation mode, the valve to the demand is closed, and the valve to the recirculation loop is open in valve 26. As illustrated in FIG. 1, a pump 28 recirculates the heated DI water through a recirculation loop so as to pass through the heater 24 and be maintained at approximately the desired processing temperature. As seen in FIGS. 1-5, the recirculation loop excludes a storage tank. A check valve 30 is installed in the recirculation loop to ensure the proper direction of fluid flow. The recirculation loop also includes a pressure release valve 32 for safety purposes in the event that the pressure in the recirculation loop becomes excessive.

In order to protect the pump 28 and heater module 24, the recirculated DI water is monitored for air gaps or bubbles in the line. Thus, the system 10 employs the use of a liquid level sensor 34 in the system 10 to detect air bubbles and air gaps in the DI water. As illustrated in FIG. 1, a liquid level sensor 34 may be placed after the heater module 24 to ensure that sufficient water is being passed through the heater module 24. In the event that it is not, inlet valve 22 can be opened to allow more DI water to be passed through the heater module 24. A vent valve 36 is opened to allow the heated DI water to pass through a vent line and be drained or reclaimed. A second liquid level sensor 38 monitors the vent line to determine when only DI water is flowing through the vent line so as to close the vent valve 36 and the inlet valve 22 to allow the DI water to continue recirculating.

Figure 2:
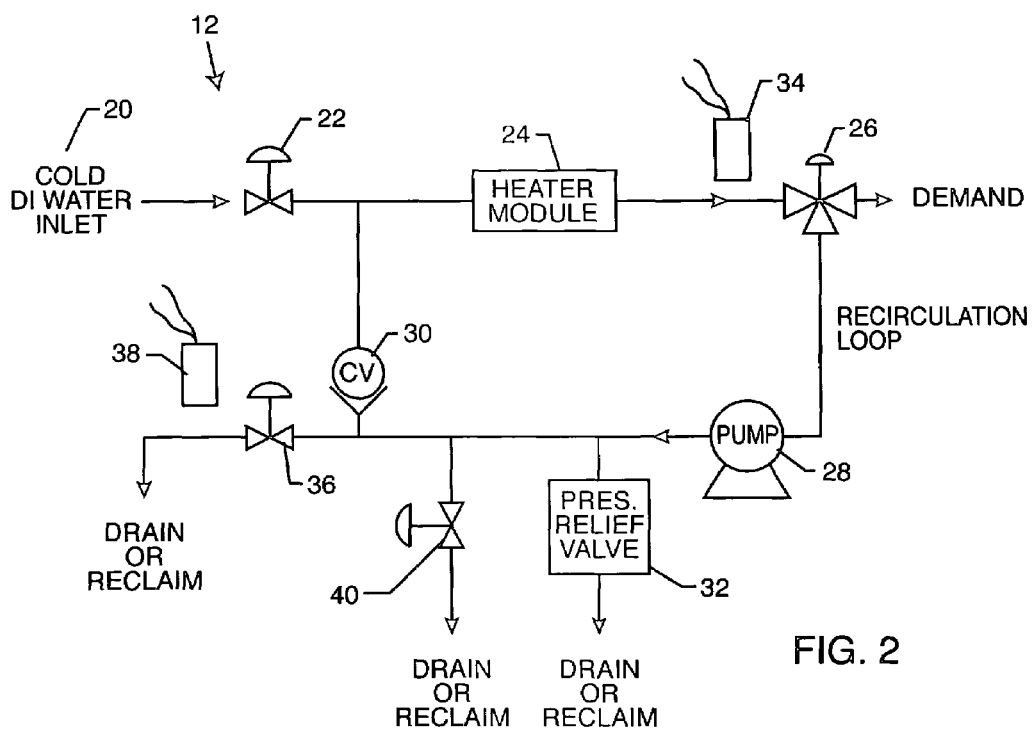
FIG. 2 is a schematic diagram of another embodiment of the present invention, providing a drain in the recirculation loop for eliminating air bubbles or standing water in the system.

With reference now to FIG. 2, an alternative system embodiment 12 is illustrated. In this embodiment 12, the "deionized" water 20 is supplied to the system inlet 22, such as at standard pressures between 20 to 60 PSI. As discussed above, the inlet valve 22 is open during demand periods such that the incoming DI water is passed through the heater 24 and out the outlet valve 26 to the end user processing demands. The heater is configured to heat the incoming DI water to a desired temperature with a single pass.

When no demand is required, the system 12 goes into a recirculating mode wherein the three-way valve 26 diverts the DI water away from the demand and instead sends the DI water to a pump 28, which recirculates the DI water back through the heater 24. A pressure release valve 32 and check valve 30 ensure the proper fluid flow direction and safety of the system 12.

As discussed above, a vent line is present to allow air bubbles to escape the system 12 when a liquid sensor 34 detects air bubbles or air gaps in the DI water. The DI water is sent through a vent line through valve 36 until liquid level sensor 38 only detects DI water and not air bubbles or air gaps. At the same time, inlet valve 22 is open to allow more DI water to fill the recirculation loop completely.

In this embodiment, a purge line valve is included in the recirculation loop and programmed to open when the system returns to the demand mode. That is, after the system 12 is done recirculating the DI water, and the user demands water, the three-way valve 26 is open to direct the DI water to the demand. At this time, valves 36 and 40 are open to allow any remaining DI water in the recirculation loop to drain out of the system 12. This prevents standing water in the system 12 so as not to contribute to the potential for bacteria growth or other contamination in the recirculation loop.

Figure 3:
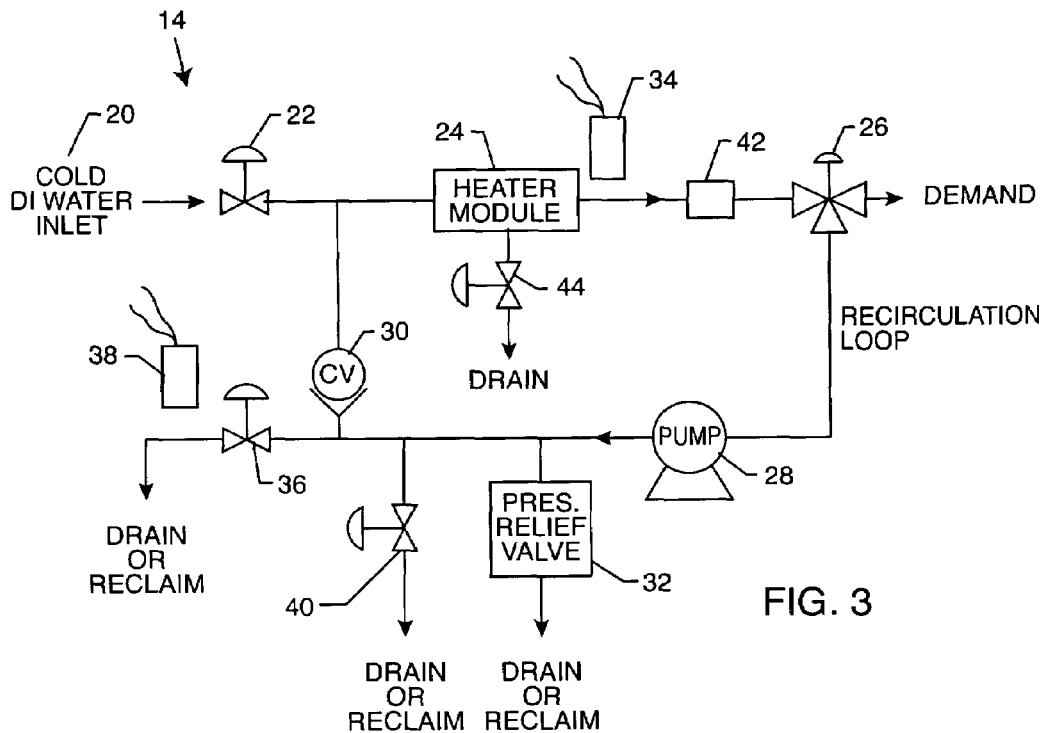
FIG. 3 is a schematic diagram of another embodiment of the present invention, including the provision of a drain at the heater module.

With reference now to FIG. 3, as with the embodiments described above, DI water 20 is supplied at a system 14 inlet 22 at standard pressure. Similar to that described above, the DI water flows through the inlet valve 22 through the heater 24 so as to be heated through the processing center in one pass, and out the outlet valve 26 to the end user processing demand. When there is no demand, the heated DI water is directed through a circulation loop by pump 28. A pressure release valve 32 and check valve 30 are present for safety purposes.

Liquid level sensors 34 and 38 are used to detect air bubbles and air gaps in the recirculated DI water, and open valve 36 to drain, discharge or reclaim the DI water containing the air bubbles, while opening inlet valve 22 to replenish or restore the level of heated DI water in the recirculation loop.

In this embodiment 14, a sensor 42 is provided for monitoring the relative purity of the DI water by detecting levels of contaminants, such as biological contaminants. Typically a resistivity sensor is utilized as DI water with little or no amount of contaminants has a very high resistivity (typically in the 18 Meg-Ohm range). However, other types of sensors can be used to indicate DI water purity levels.

In this embodiment 14, a valve 44 is incorporated into the heater module 24 for selectively draining the DI water from the heater module 24. The valve 44 can be used in combination with the purity sensor 42 while the system is in the recirculation mode. If the system is allowed to run in the recirculation mode for prolonged periods of time, and the sensor 42 detects a degradation in the water purity level, then the valve 44 can be opened to purge the system 14 of the existing DI water while allowing fresh DI water to enter through the inlet valve 22. Valves 36 and 40 can also be opened during this process to completely drain the contaminated recirculating DI water.

An optional feature in the system 14, is that one or more of the drain valves 36, 40 and 44 can be programmed to automatically open periodically to purge the system 14 to ensure water quality. Although the system has an internal recirculation mode, a user may decide that DI water in a recirculation mode after a sufficiently prolonged period of time may no longer have a high enough water quality, and therefore the user may wish to periodically flush the system 14 and refill it with fresh DI water. The auto-purge valves (36, 40 or 44) can be programmed to open at periodic intervals while the system in a recirculation mode to replace the recirculated DI water that has been in the system for too long with fresh water, or it could take the signal from the in-line contamination sensor 42 to monitor the water purity quality.

As described above, valves 36, 40 and/or 44 can be opened when returning the to the demand mode to drain any DI water in the recirculating loop to prevent standing water in the system so as not to contribute to the potential for bacterial growth in the recirculation loop or component parts thereof.

Figure 4:
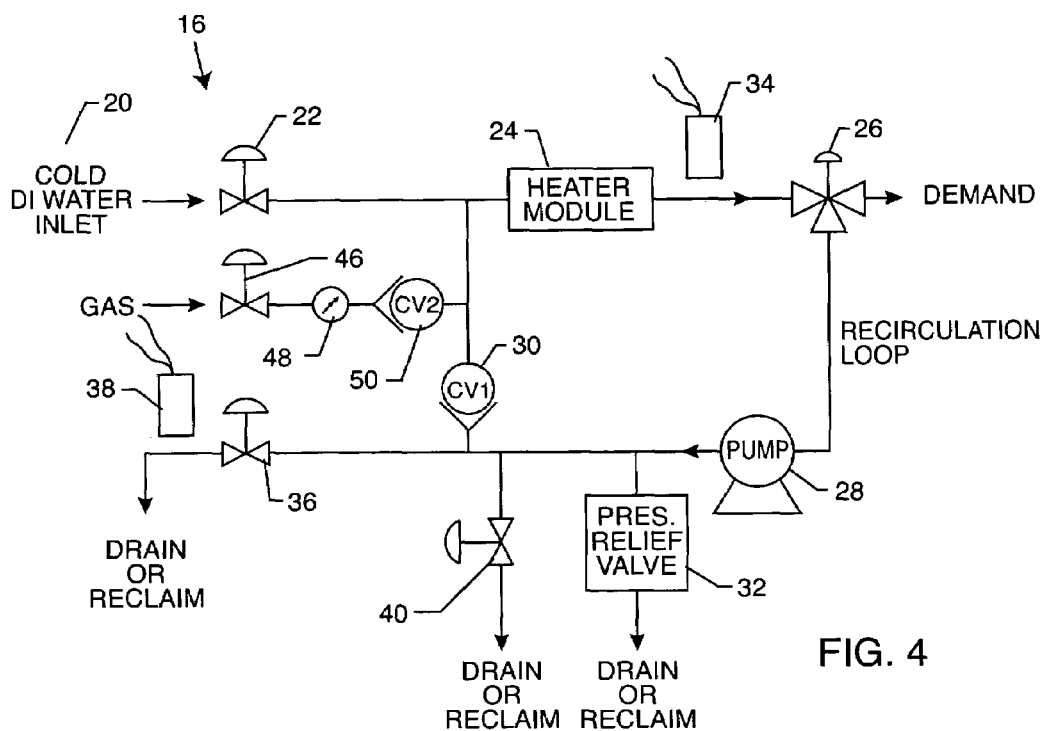
FIG. 4 is a schematic diagram of another embodiment of the present invention, including a source of gas and gas inlet into the system.

With reference now to FIG. 4, similar to that described above, DI water from the source 20 is introduced through inlet valve 22 through heater 24 to heat it to processing temperature in a single pass and through outlet valve 26 in the demand mode and time period. When not in the demand mode, valve 26 directs the heated DI water to a pump 28 and a recirculation loop for recirculation until the demand mode is initiated once again. A check valve 30 ensures proper fluid flow direction, and a pressure release valve 32 is present for safety purposes. One or more sensors 34 and 38 are used to detect air gaps, air bubbles, contaminations, etc., and open drain or discharge valves 36 and 40 to eliminate the air bubbles or contamination from the system 16. In such instance, inlet valve 22 is opened to introduce a replenishment source of heated DI water into the recirculation loop.

In the embodiment 16 illustrated in FIG. 4, a gap inlet valve 46 is operably connected to a source of gas for introduction into the system 16. A gas gauge 48 and a check valve 50 may also be incorporated to determine that the proper level of gas is being introduced into the system 16, and also to prevent the back-flow of DI water into the gas source.

The introduction of a gas into the system 16 can serve several purposes. For example, increased turbulence in the recirculation loop can be accomplished by periodically bubbling nitrogen or clean dry air into the recirculating DI water. Increased turbulence dislodges any accumulating particles and/or inhibits or prevents bacteria growth in the system 16. Alternatively and/or additionally, the gas inlet 46 may be used to periodically inject a biocidal gas, such as ozone, into the recirculation loop for killing any existing bacteria or any other biological contaminants. The injected gases may be released from the system 16 using the vent line valve 36, as described above.

As described above, the system 16, and particularly, the recirculation loop, can be purged of standing DI water by opening valves 36 and 40 when the demand mode is again initiated to prevent the potential for bacteria growth in the recirculation loop.

Figure 5:
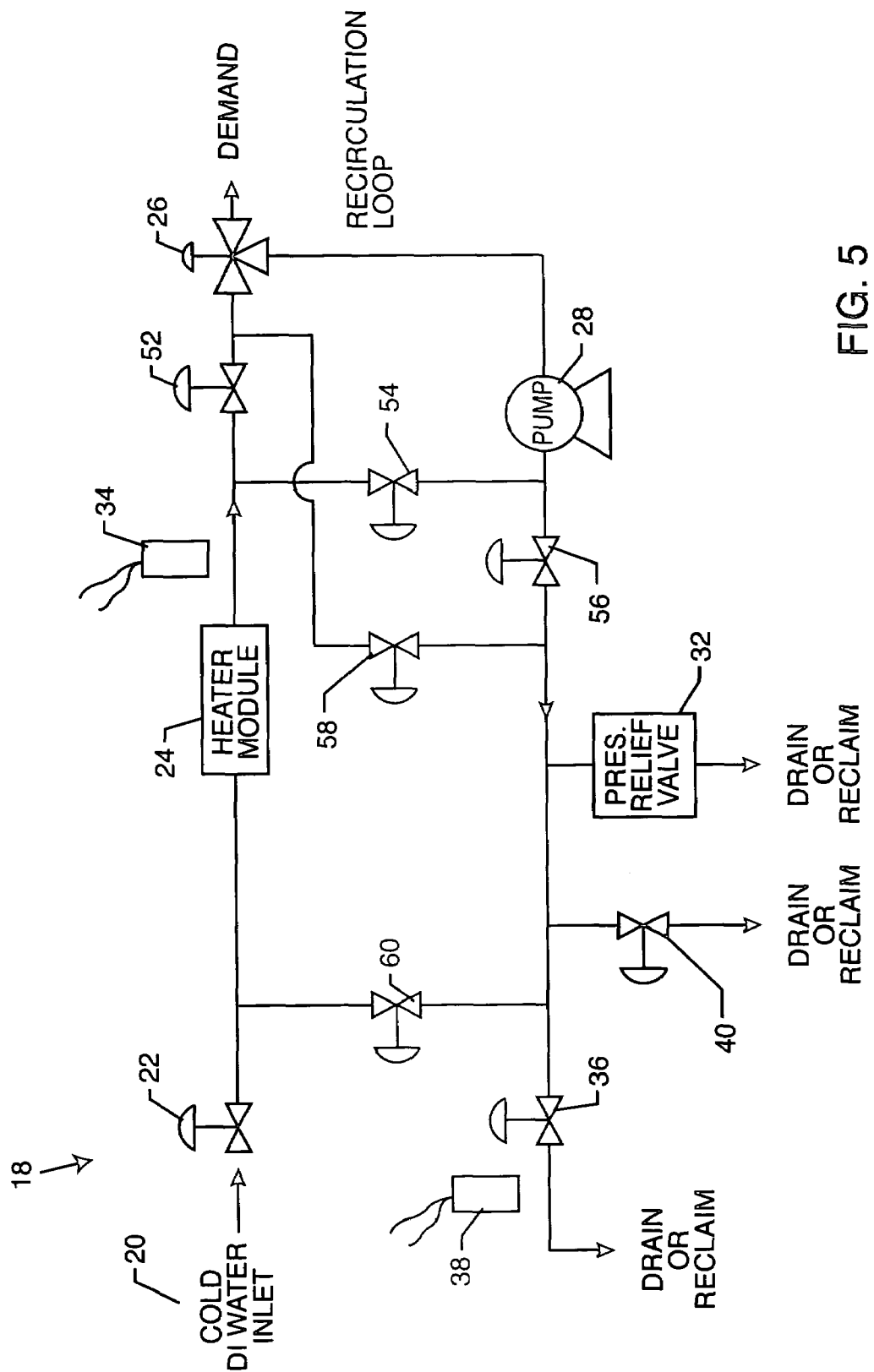
FIG. 5 is a schematic diagram illustrating yet another embodiment of the present invention, including multiple valves for directing the recirculated deionized water through alternate recirculating loop paths in accordance with the present invention.

With reference now to FIG. 5, another embodiment of the system 18 is illustrated. In this embodiment, similar to the embodiments described above, cold DI water 20 is introduced into the system 18 through inlet valve 22, through the heater 24 where it is heated to processing temperatures based upon predetermined calculations so as to be heated in a single pass, and through the outlet valve 26 to the end user processing demands.

When there is no demand, the valve 26 directs the fluid into a recirculation loop. As discussed above, various sensors, such as liquid level sensors 34 and 38, may be utilized to determine levels of contamination or purity of the recirculating DI water, presence of air gaps or bubbles, etc., so as to purge the system 18 utilizing valves 36 and 40 while introducing fresh DI water 20 through inlet valve 22 to replenish the system 18. Such discharge valves 36 and 40 can be controlled by the sensors 34 and 38, or automatically used to purge the recirculating loop of potentially stagnant DI water or, as described above. A pressure release valve 32 is installed for safety purposes to prevent excessive pressure within the system 18.

In this embodiment 18 a plurality of valves 52-58 and additional plumbing lines are used to create alternative paths in the recirculation loop. For example, valve 52 can be closed so as to direct the heated DI water through valve 54. Alternatively, valve 26 can be completely closed, valve 52 opened, causing the heated DI water to flow through valve 58.

In normal recirculation mode, valves 52 and 56 are open, allowing the pump 28 to pump the DI water through valve 26, valve 56, valve 60 and through the heater 24 and finally back to the pump 26 again. The flow can be reversed when valves 52 and 56 are closed and valves 54 and 58 are opened, allowing the pump 26 to flow the DI water through valve 54, through the heater module 24, through valve 60, and then through valve 58, through the valve 26 and then back through the pump 28.

Valve 60 is open during the recirculation mode, but closed during demand periods and venting. This valve 60 forces the incoming DI water to flow through the heater module 24.

It will be appreciated by those skilled in the art that the number of additional valves and recirculation loop lines can be altered in number. The important aspect of this embodiment 18 is that periodically changing the flow direction of the DI water increases the turbulence of the fluid path. By changing flow direction, the system 18 can eliminate particle accumulation, or inhibit bacteria growth in areas inaccessible to the flow of DI water when the flow is only in one direction. Deposits and particles become dislodged with change in flow direction and will not be allowed to accumulate.

Of course, it will be appreciated by those skilled in the art that the various components and features of the afore-described embodiments 10-18 can be combined with one another as needed. For example, the heater module 24 may include a drain valve 44 in any of the embodiments for the purposes described above. Similarly, a contamination sensor 42, such as the resistivity sensor can be incorporated into any of the embodiments 10-18.

The present invention eliminates the trickle-flow or autoflow present in existing systems and thus saves a tremendous amount of DI water. The system 10-18 described above provides substantial savings in DI water consumption, and the attendant cost thereof. This is due to the fact that instead of being discharged in a trickle or idle flow, the system of the present invention reverts to an internal recirculation mode during no demand period. The recirculation mode is designed to keep the DI water flowing at linear velocities for reducing the potential for bacteria and particle build-up. As the recirculated DI water is passed through the heater in the recirculation mode, the process temperatures are maintained at an elevated state. This substantially reduces or even eliminates the wait time that occurs when a system goes from a no demand to a demand mode as the temperature of the DI water recirculating is already at or near processing temperature when the end user needs it. Of course, a reduced wait time allows the user to increase the amount of products that can be manufactured.

Although several embodiments have been described in detail for purposes of illustration, various modifications may be made without departing from the scope and spirit of the invention. Accordingly, the invention is not to be limited, except as by the appended claims.

What is claimed is:

1. A method for reducing deionized water consumption by delivering the deionized water at an elevated processing temperature, comprising the steps of:
    providing a heater adapted to heat the deionized water to a predetermined processing temperature in a single pass;
    passing the deionized water through the heater;
    directing the heated deionized water to an end user when demanded; and
    directing the heated deionized water through a recirculation loop including the heater when the deionized water is not demanded by the end user,
    wherein said recirculation loop excludes a storage tank.

2. The method of claim 1, including the step of monitoring the deionized water for contaminates.

3. The method of claim 2, including the step of discharging at least a portion of the deionized water when contaminates are detected.

4. The method of claim 2, including the step of providing a resistivity sensor for monitoring the deionized water for contaminates.

5. The method of claim 1, including the step of monitoring recirculated deionized water for bubbles.

6. The method of claim 5, including the step of venting the bubbles from the recirculated deionized water.

7. The method of claim 6, including the step of introducing additional deionized water through the heater and into the recirculated deionized water to replace the vented bubbles.

8. The method of claim 1, including the step of altering the path of the recirculated deionized water.

9. The method of claim 1, including the step of introducing a gas into the deionized water.

10. The method of claim 9, including the step of introducing a biocidal gas into the deionized water.

11. The method of claim 9, including the step of introducing a pressurized gas to create turbulence in the deionized water for inhibiting biological contamination.

12. A method for reducing deionized water consumption by delivering the deionized water at an elevated processing temperature, comprising the steps of:
    providing a heater adapted to heat the deionized water to a predetermined processing temperature in a single pass;
    passing the deionized water through the heater;
    directing the heated deionized water to an end user when demanded;
    directing the heated deionized water through a recirculation loop including the heater when the deionized water is not demanded by the end user;

monitoring the deionized water for contaminates and discharging at least a portion of the deionized water when contaminates are detected; and monitoring the recirculated deionized water for bubbles and venting the bubbles from the recirculated deionized water.

13. The method of claim 12, including the step of providing a resistivity sensor for monitoring the deionized water for contaminates.

14. The method of claim 12, including the step of introducing additional deionized water through the heater and into the recirculated deionized water to replace the vented bubbles.

15. The method of claim 12, including the step of altering the path of the recirculated deionized water.

16. The method of claim 12, including the step of introducing a gas into the deionized water.

17. The method of claim 16, including the step of introducing a biocidal gas into the deionized water.

18. The method of claim 16, including the step of introducing a pressurized gas to create turbulence in the deionized water for inhibiting biological contamination.

19. A method for reducing deionized water consumption by delivering the deionized water at an elevated processing temperature, comprising the steps of:

providing a heater adapted to heat the deionized water to a predetermined processing temperature in a single pass;

passing the deionized water through the heater;

directing the heated deionized water to an end user when demanded;

directing the heated deionized water through a recirculation loop including the heater when the deionized water is not demanded by the end user;

monitoring the deionized water for contaminates; and discharging at least a portion of the deionized water from the recirculation loop when contaminates are detected.

20. The method of claim 19, including the step of providing a resistivity sensor for monitoring the deionized water for contaminates.

21. A method for reducing deionized water consumption by delivering the deionized water at an elevated processing temperature, comprising the steps of:

providing a heater adapted to heat the deionized water to a predetermined processing temperature in a single pass;

passing the deionized water through the heater;

directing the heated deionized water to an end user when demanded;

directing the heated deionized water through a recirculation loop including the heater when the deionized water is not demanded by the end user;

monitoring recirculated deionized water for bubbles; and venting the bubbles from the recirculated deionized water.

22. The method of claim 21, including the step of introducing additional deionized water through the heater and into the recirculated deionized water to replace the vented bubbles.

* * * * *